Dec. 9, 1941.  F. M. HOGG  2,265,691

LATCH STRIKE

Filed Jan. 26, 1940

Inventor:
Francis M. Hogg,
by  Harry E. Dunham
His Attorney.

Patented Dec. 9, 1941

2,265,691

UNITED STATES PATENT OFFICE 2,265,691

LATCH STRIKE

Francis M. Hogg, Erie, Pa., assignor to General Electric Company, a corporation of New York Application January 26, 1940, Serial No. 315,792

7 Claims. (Cl. 292—340)

My invention relates to latches and more particularly to strikes for latches.

It is an object of my invention to provide new and improved means for accurately positioning the parts of a latch strike in predetermined positions during assembly thereof with a minimum effort on the part of the workman and for maintaining the aforementioned parts in a predetermined position.

Further objects and advantages of my invention will become apparent as the following description proceeds and the features of novelty which characterize my invention will be pointed out with particularity in the claims annexed to and forming a part of this specification.

Figure 1:
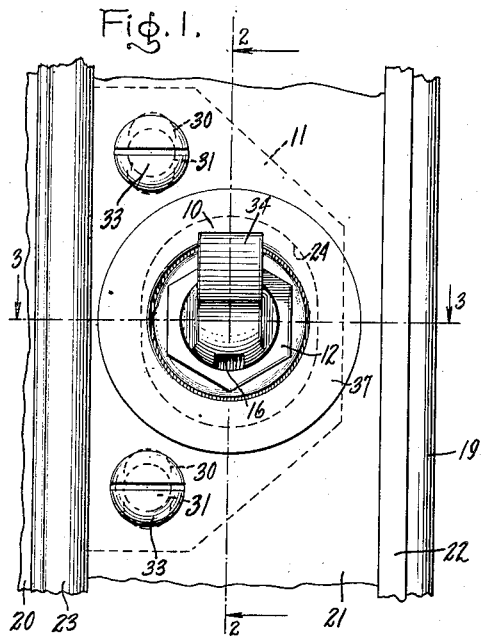
Figure 2:
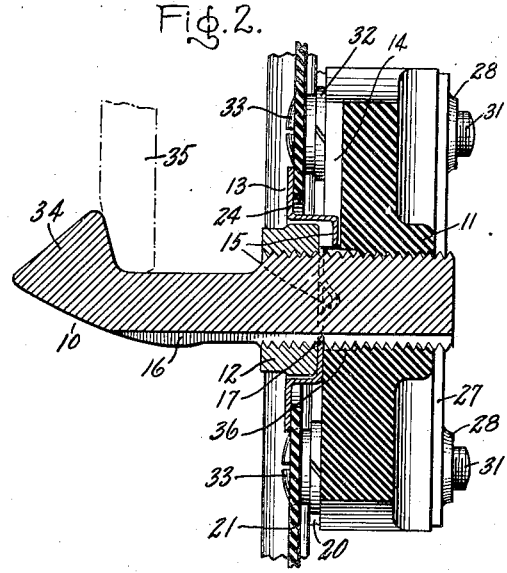
Figure 3:
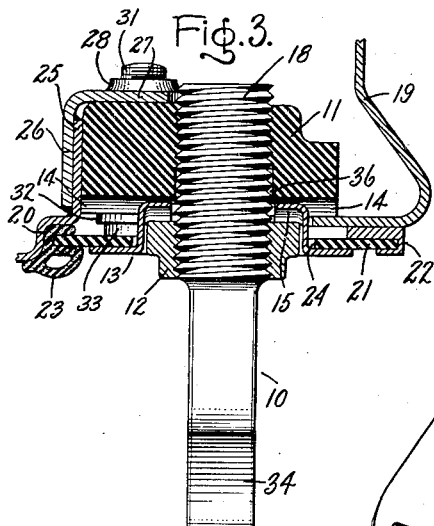
Figure 4:
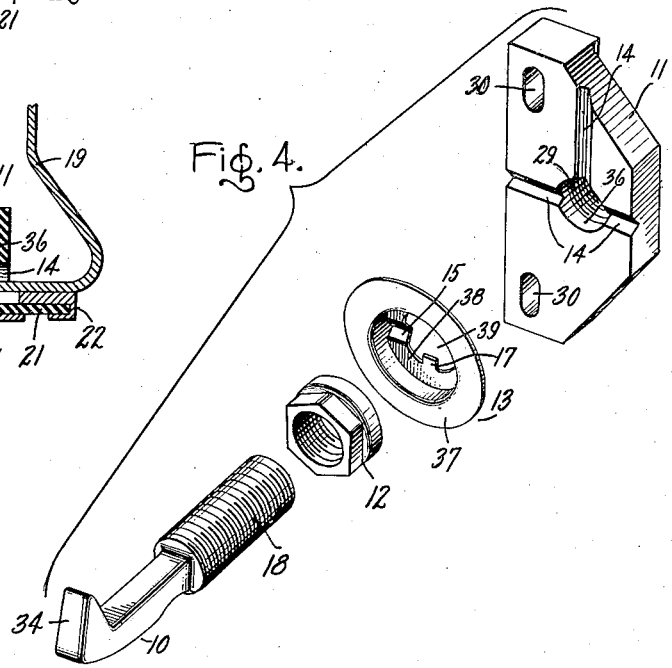

For a better understanding of my invention reference may be had to the accompanying drawing in which Fig. 1 is an elevational view of my invention applied to a door latch in a refrigerator; Fig. 2 is a vertical section of the arrangement shown in Fig. 1 taken along the line 2—2 of Fig. 1; Fig. 3 is a horizontal section of the arrangement disclosed in Fig. 1 taken along line 3—3 of Fig. 1; and Fig. 4 is an exploded view illustrating the assembly of some of the parts illustrated in Figs. 1 to 3, inclusive.

I have illustrated my invention in connection with a door strike adapted for use with refrigerators. Thus, in the drawing I have shown a strike 10 threadingly engaging a block or base member 11. The strike 10 is secured in position by means of a fastening member such as a threaded nut 12, a lock washer 13 being interposed between the base member 11 and the nut 12. As best seen in Fig. 4, the block 11 is provided on a face thereof with a plurality of grooves or recesses 14 for reception of projections 15 located on one side of the washer 13. The strike 10 is provided with a depression such as a longitudinally extending groove 16 and the washer 13 is provided with a tongue or projection 17 for engagement with the slot or groove 16. In assembling the strike illustrated in the drawing the nut 12 is threaded onto the threaded portion 18 of the strike 10. Lock washer 13 is then passed over the portion 18 of the strike 10 with the tongue 17 extending into the groove 16. This assembly of parts is then threaded into the member 11 until the projections 15 engage or are adjacent to the sides of the grooves 14. The nut 12 is then rotated in a direction to urge projections 15 into the grooves 14 and to secure the assembly. Thus, the lock washer 13 interlocks the strike 10 and member 11 so that relative rotation therebetween is impossible and by properly placing the grooves 14 and projections 15 as well as the groove 16 and tongue 17 the various parts may be assembled in the proper predetermined positions very readily.

Describing my invention in greater detail, I have illustrated an inner metallic casing or liner 19 and an outer metallic casing or liner 20 of a refrigerator of the domestic type, the complete cabinet not being shown. The space between the liners 19 and 20 is closed by a breaker strip 21, preferably of non-metallic, non-hygroscopic material, for example, resinous products, such as those known under the trade name "Bakelite," "Textolite," etc., in order to reduce the conduction of heat into the interior of the cabinet. The breaker strip 21 is suitably retained in position as by means of a bezel 22 suitably attached to the inner liner 19 and a combined bezel and gasket 23 suitably secured to the outer liner 20. An opening 24 is provided in the breaker strip 21 for the reception of the strike 10 and lock washer 13.

In order to support the base member 11 in proper position behind the opening 24, I have provided a laterally extending flange 25 on the outer liner 20 to which is suitably secured a back plate 26 as by welding, for example. The back plate 26 has a portion 27 extending substantially perpendicular to the door strike 10. The portion 27 of the back plate 26 is provided with a pair of threaded bosses 28.

The base member or block 11 is formed of any desired shape and is preferably of non-heat-conductive material such as that described above in connection with the breaker strip 21 in order to minimize the conduction of heat between the door strike 10 and the interior of the cabinet. The block 11 is provided with a threaded bore 29 to receive the threaded portion 18 of the strike 10. In order to support the member 11 on the back plate 26, I have provided a pair of elongated openings 30 corresponding to the bosses 28 of the back plate 26 and suitable fastening means, as threaded bolts 31, extending through the openings 30 into engagement with the threaded bosses. If desired, lock washers 32 may be provided between the member 11 and the heads 33 of the bolts 31.

The strike 10 comprises two portions, a threaded portion 18 and a bolt engaging portion 34 arranged to engage a bolt 35, the bolt being shown in outline form in Fig. 2. The portion 18 of the strike 10 is arranged for threaded engagement with bore 29 of member 11. Whenever relatively fine threads are employed, it may be desirable to counterbore the bore 29, as indicated at 36, to a diameter slightly greater than the overall diameter of the threaded portion 18 in order to serve as a guide when the strike 10 is initially threaded into the bore 29.

As shown, the lock washer 13 is provided with a peripheral portion 37 and a depressed portion 38, the latter having an opening 39 to permit passage of the strike 10. The side of the depressed portion 37 next to the member 11 is provided with substantially V-shaped projections 15 corresponding in shape and position to the grooves 14. Thus, there is provided a plurality of substantially centrally arranged projections with respect to the portion 37 which correspond to the grooves 14 closely in cross section and length as well as position whereby the projections extend into the grooves 14 and fit sufficiently closely to minimize play between the base member 11 and the washer 13. In order to position accurately the above-described parts in the assembly thereof with a minimum of effort I have illustrated the use of three substantially V-shaped radially-extending grooves 14 of substantial length in the face of member 11 next to the lock washer 13. Two of the grooves are disposed horizontally and are diametrically opposed for accurately positioning the member 10 in the vertical direction. Whenever it is sufficient to insure accuracy in but one direction only, two diametrically-opposed grooves are sufficient but in applications, such as the door strike illustrated and described herein, where it is essential that the bolt engaging portion 34 be accurately located not only vertically but with the bolt engaging portion disposed in the proper direction (upwardly in this case) I provide a third groove 14, although if preferred, two grooves, 14, will serve. In such a case the grooves preferably are not diametrically arranged. Thus, by providing three grooves or two grooves not diametrically disposed, the possibility of assembling the parts with the strike upside down is precluded.

In order to interlock the washer 13 and strike 10, a longitudinally extending groove 16 is cut in the under side of strike 10, in which position it will be substantially hidden from view, for the reception of the vertically arranged tongue 17 extending into the opening or aperture 39. If it is desired to have the bolt engaging portion 34 of the strike 10 directed upwardly, as is the case in the illustrated embodiment of my invention, the groove 16 will be opposite the head or bolt engaging portion 34.

The method of assembly of the aforementioned parts has been referred to previously. It might be added that in the illustrated embodiment of my invention the strike 10 carrying the nut 12 and lock washer 13 will be threaded into the bore 29 until the projections 15 correspond with the grooves 14 with the portion 34 of the strike 10 extending the proper distance from the breaker strip 21 in order to engage the bolt 35 and maintain the closure member (not shown) with the proper pressure against the gasket 23. The nut 12 is then tightened. Thus, I have provided an arrangement in which the strike 10 may be readily adjusted toward and from the object to which it is secured and the parts accurately positioned so that the workman engaged in assembling the strike is not required to take time to position accurately the parts by inspection.

By providing elongated openings or holes 30 in the member 11 and by making the opening 24 in the breaker strip 21, approximately oval in shape, I provide means for shifting the strike in a vertical direction. Vertical adjustment is facilitated by extending the heads 33 of the bolts 31 through suitable openings in the breaker strip 21. With this arrangement in order to adjust the strike vertically, the bolts 31 may be loosened, the strike 10 moved to the proper vertical position and the bolts 31 again tightened.

It will be apparent that use of my invention permits the compensation of inaccuracies of manufacture. For example, in the manufacture of refrigerators by mass production methods, it is extremely difficult to maintain an exact relationship of position between door and cabinet, but such variations as occur may be readily compensated for with the apparatus above described.

Modifications will occur to those skilled in the art. Thus, while I have illustrated grooves 16 and 14 in strike 10 and member 11, respectively, for the reception of projections 17 and 15, respectively, the member 11 may be provided with projections, if desired, extending into suitable recesses or openings in the washer 13.

While I have shown a particular embodiment of my invention in connection with a refrigerator, I do not desire my invention to be limited to the particular construction shown and described and I intend in the appended claims to cover all modifications within the spirit and scope of my invention.

What I claim as new and desire to secure by Letters Patent of the United States is:

1. In a latch mechanism, the combination of a base member having a threaded bore, a latch strike having a threaded portion arranged to be threaded into said bore, a threaded securing member associated with said portion, a washer interposed between said members, said base member having a radially extending groove of substantial length, said washer having a projection disposed substantially centrally of said washer, said projection corresponding closely to the cross-sectional shape and length of said groove and extending into said groove, said washer also having a second projecting portion, said strike having a depression for receiving said second projecting portion, said members, said strike and said washer cooperating to position the aforementioned parts with respect to each other and to maintain said parts in a predetermined position with respect to each other.

2. In a latch mechanism, a strike comprising a bolt engaging portion and a threaded portion having a longitudinally extending groove, a base member having a threaded bore for receiving said threaded portion, a lock washer engaging said strike and said base member, the face of said member next to said washer having a radially extending groove of substantial length, said washer having a corresponding projecting portion disposed centrally of said washer, said portion corresponding closely to the cross sectional shape and length of said radial groove and extending into said radial groove and also a tongue extending into said first-mentioned groove, a threaded fastening member for urging said washer into engagement with said base member, said tongue cooperating with said first-mentioned groove and said projecting portion cooperating with said radial groove for maintaining said strike in a predetermined position with respect to said base member.

3. In a latch mechanism, a strike comprising a bolt engaging portion and a threaded portion having a longitudinally extending groove, a base member having a threaded bore for receiving said threaded portion, a lock washer engaging said strike and said base member, the face of said member next to said washer having a pair of radially extending diametrically opposed grooves, said washer having projecting portions disposed centrally of said washer, said portions corresponding closely to the cross sectional shapes and lengths of said radial grooves and extending thereinto and also a tongue extending into the first-mentioned groove, a threaded fastening member for urging said washer into engagement with said base member, said tongue and first-mentioned groove and also said projecting portions and said radially-extending grooves being disposed to maintain said strike in a predetermined position.

4. In a latch mechanism a strike comprising a bolt engaging portion and a threaded portion having a longitudinally extending groove, a base member having a threaded bore for receiving said threaded portion, a lock washer engaging said strike and said base member, the face of said member next to said washer having three grooves extending radially from said bore, said radial grooves being of substantial length, said washer having projecting portions disposed centrally of said washer, said projecting portions corresponding closely to the cross sectional shape and length of said radial grooves and extending thereinto and also a tongue extending into the first-mentioned groove, a threaded fastening member for urging said washer into engagement with said base member, said tongue and first-mentioned groove and also said projecting portions and said radially-extending grooves being disposed to maintain said strike in a predetermined position.

5. In a latch mechanism, a strike comprising a bolt engaging portion and a threaded portion having a longitudinally extending groove, a base member having a threaded bore for receiving said threaded portion, a lock washer engaging said strike and said base member, the centrally disposed portion of said washer being depressed, the surface of the depressed portion adjacent said member having a projecting portion, the face of said member adjacent said depressed portion having a recess complementary in shape to said projecting portion, said depressed portion having an aperture therein to receive said strike and a tongue extending into the first-mentioned groove, and a threaded fastening means disposed in the depression in said washer for urging the washer into engagement with the base member.

6. In a latching mechanism for a heat-insulated cabinet of the type having inner and outer casings maintained in spaced relationship and a breaker strip closing the space between the casings, the combination of a base member disposed between the casings, said base member being provided with a threaded bore, said strip having an opening aligned with said bore, a strike extending through said opening and including a threaded portion for engagement with said bore and also having a longitudinally extending groove, a lock washer having a centrally disposed depressed portion extending through said opening, said depressed portion having an aperture centrally disposed for receiving said strike, the remaining portion of said washer being arranged and constructed for concealing the edges of said opening, the outer face of said base member having a recess, the inner face of said depressed portion having a projection corresponding to said recess and extending into said recess for preventing relative movement between said base member and said washer, a threaded fastening member for urging said washer into engagement with said base member, said fastening member being disposed in said depressed portion, said washer also being provided with a tongue projecting into said longitudinally extending groove for preventing relative motion between said washer and said strike.

7. In a latching mechanism for a heat-insulated cabinet of the type having inner and outer casings maintained in spaced relationship and a breaker strip closing the space between the casings, the combination of a base member disposed between the casings, said base member being provided with a threaded bore, said strip having an opening aligned with said bore, a latch strike extending through said opening and including a threaded portion for engagement with said bore and also having a longitudinally extending groove, a washer having a centrally disposed depressed portion extending through said opening, said depressed portion having an aperture centrally disposed for receiving said strike, the outer portion of said washer being arranged and constructed for concealing the edges of said opening, and a threaded fastening member for urging said washer into engagement with said base member, said fastening member being disposed in said depressed portion.

FRANCIS M. HOGG.